United States Patent
Diament et al.

(10) Patent No.: US 8,645,945 B2
(45) Date of Patent: *Feb. 4, 2014

(54) METHOD AND APPARATUS FOR DYNAMIC MIDDLEWARE ASSEMBLY

(75) Inventors: Judah K. Diament, Bergenfield, NJ (US); Thomas A. Mikalsen, Cold Spring, NY (US); Isabelle M. Rouvellou, New York, NY (US); Stefan Tai, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 602 days.

This patent is subject to a terminal disclaimer.

(21) Appl. No.: 12/853,037

(22) Filed: Aug. 9, 2010

(65) Prior Publication Data

US 2010/0306761 A1    Dec. 2, 2010

Related U.S. Application Data

(63) Continuation of application No. 10/991,149, filed on Nov. 17, 2004, now Pat. No. 7,797,698.

(51) Int. Cl.
*G06F 9/44* (2006.01)
*G06F 9/445* (2006.01)

(52) U.S. Cl.
USPC ............ 717/175; 717/169; 717/171; 717/176

(58) Field of Classification Search
None
See application file for complete search history.

(56) References Cited

U.S. PATENT DOCUMENTS

| | | | |
|---|---|---|---|
| 5,805,897 A * | 9/1998 | Glowny | 717/178 |
| 5,892,953 A * | 4/1999 | Bhagria et al. | 717/175 |
| 5,960,204 A * | 9/1999 | Yinger et al. | 717/176 |
| 6,189,051 B1 * | 2/2001 | Oh et al. | 717/175 |
| 6,279,154 B1 | 8/2001 | Davis | |
| 6,301,708 B1 * | 10/2001 | Gazdik et al. | 717/175 |
| 6,351,850 B1 * | 2/2002 | van Gilluwe et al. | 717/175 |
| 6,378,128 B1 * | 4/2002 | Edelstein et al. | 717/174 |
| 6,401,238 B1 * | 6/2002 | Brown et al. | 717/177 |
| 6,494,979 B1 | 12/2002 | DiChiara, Jr. | |
| 6,681,392 B1 * | 1/2004 | Henry et al. | 717/176 |
| 6,721,946 B1 | 4/2004 | Fogarty et al. | |
| 6,769,118 B2 * | 7/2004 | Garrison et al. | 717/177 |
| 6,854,112 B2 * | 2/2005 | Crespo et al. | 717/174 |
| 6,918,112 B2 * | 7/2005 | Bourke-Dunphy et al. | 717/177 |
| 6,985,939 B2 * | 1/2006 | Fletcher et al. | 709/223 |
| 7,058,942 B2 * | 6/2006 | Bourke-Dunphy et al. | 717/177 |
| 7,103,874 B2 | 9/2006 | McCollum et al. | |

(Continued)

OTHER PUBLICATIONS

Microsoft Computer Dictionary 5$^{th}$ Edition, published by Microsoft, 2002, ISBN 0-7356-1495-4, p. 340.*

(Continued)

*Primary Examiner* — Tuan Q. Dam
*Assistant Examiner* — Zheng Wei
(74) *Attorney, Agent, or Firm* — Preston Young (57) ABSTRACT

In one embodiment, the present invention is a method and apparatus for dynamic middleware assembly. One embodiment of the inventive method for dynamically assembling middleware at a client involves selecting a middleware component from a group of middleware components, where the selection is based at least in part on a first profile defining characteristics of the client and a second profile defining characteristics the selected middleware component. The selected middleware component is then dynamically assembled (installed and configured) at the client.

19 Claims, 5 Drawing Sheets

(56) References Cited

U.S. PATENT DOCUMENTS

| | | | |
|---|---|---|---|
| 7,185,336 B2* | 2/2007 | Vaughan | 717/178 |
| 7,203,937 B1 | 4/2007 | Kyle et al. | |
| 7,228,189 B1* | 6/2007 | Gaddy et al. | 700/94 |
| 7,228,542 B2* | 6/2007 | Bryant et al. | 717/177 |
| 7,340,739 B2* | 3/2008 | Alam | 717/175 |
| 7,343,601 B2* | 3/2008 | Azagury et al. | 717/176 |
| 7,353,281 B2* | 4/2008 | New et al. | 709/229 |
| 7,363,623 B2* | 4/2008 | Kishida | 717/174 |
| 7,500,237 B1* | 3/2009 | Saiyed et al. | 717/174 |
| 7,584,471 B2* | 9/2009 | Bjare et al. | 717/178 |
| 7,676,448 B2* | 3/2010 | Henderson et al. | 717/171 |
| 7,797,698 B2 | 9/2010 | Diament et al. | |
| 7,844,963 B2* | 11/2010 | Pitzel et al. | 717/171 |
| 8,042,107 B2* | 10/2011 | Amodio et al. | 717/175 |
| 8,156,489 B2* | 4/2012 | Kane | 717/176 |
| 2002/0091939 A1* | 7/2002 | Garrison et al. | 713/201 |
| 2002/0133814 A1* | 9/2002 | Bourke-Dunphy et al. | 717/174 |
| 2003/0037327 A1* | 2/2003 | Cicciarelli et al. | 717/178 |
| 2003/0037328 A1 | 2/2003 | Cicciarelli et al. | |
| 2003/0046682 A1* | 3/2003 | Crespo et al. | 717/178 |
| 2004/0068722 A1* | 4/2004 | Amodio et al. | 717/169 |
| 2004/0093593 A1 | 5/2004 | Jhanwar et al. | |
| 2004/0098715 A1* | 5/2004 | Aghera et al. | 717/173 |
| 2004/0123284 A1* | 6/2004 | Bryant et al. | 717/174 |
| 2005/0071838 A1 | 3/2005 | Haasaki | |
| 2005/0120344 A1* | 6/2005 | Asare et al. | 717/174 |
| 2005/0172285 A1* | 8/2005 | Bourke-Dunphy et al. | 717/177 |
| 2006/0005181 A1* | 1/2006 | Fellenstein et al. | 717/174 |
| 2006/0080656 A1* | 4/2006 | Cain et al. | 717/174 |
| 2006/0130054 A1* | 6/2006 | Bocking et al. | 717/173 |
| 2007/0214028 A1* | 9/2007 | Stich et al. | 705/8 |
| 2008/0244559 A1* | 10/2008 | Imasato et al. | 717/174 |

OTHER PUBLICATIONS

Schantz et al., Middleware for Distributed Systems Evolving the Common Structure for Network-centric Applications, published in Encyclopedia of Software Engineering, J. Marciniak, and G. Telecki, Eds. John Wiley & Sons, Inc., New York, 2001, pp. 1-15.*

Gokhale et al., Applying Model-Integrated Computing to Component Middleware and Enterprise Applications, published by Communications of The ACM Oct. 2002/vol. 45, No. 10, pp. 65-70.*

* cited by examiner

METHOD AND APPARATUS FOR DYNAMIC MIDDLEWARE ASSEMBLY

CROSS REFERENCE TO RELATED APPLICATIONS

This application is a continuation of U.S. patent application Ser. No. 10/991,149, filed Nov. 17, 2004 (now U.S. Pat. No. 7,797,698), which is herein incorporated by reference in its entirety.

BACKGROUND

The present invention relates generally to middleware, and relates more particularly to the assembly of a middleware system from discrete middleware components. Specifically, the present invention provides a method and apparatus for dynamic assembly and adaptation of middleware components.

Systems software that functions as an intermediary between different components (e.g., applications and services) is generally referred to in the computer industry as middleware. Middleware is a mechanism used to simplify the development of software systems by adding one layer of indirection between the operating system and the application. It is often employed to integrate and coordinate the interoperation of distributed, heterogeneous applications over a network. For example, middleware may allow a program written for access to a particular database to access other databases as well. Middleware is also used by applications to coordinate updates to multiple databases. In yet another example, middleware may also allow a program written in one programming language to interoperate with a (seemingly incompatible) program written in a different programming language. In all cases, the role of middleware is to functionally mediate between (software, hardware and networking) infrastructure and applications; middleware is specialized software that enables other software (e.g., applications and services) to interoperate.

Traditional middleware models, while configurable, are static; that is, specific middleware components with specific sets of features and functions are typically selected prior to application development, deployment and execution. The middleware components are installed on a specific client at which an application executes, and execution of application programs by the client is limited to the installed middleware technology.

When middleware is deployed within a service-oriented architecture, such a static model may not be optimal. In such architectures, applications will tend to dynamically find and interact with each other. Thus, the required or desired features and functions to be provided by the middleware may not be known until runtime (e.g., for services only discovered at runtime), may depend on changing system conditions (e.g., network load or global security policies), or may change over time as new versions of middleware features and functions become available.

Thus, there is a need in the art for a method and apparatus for dynamic middleware assembly.

SUMMARY OF THE INVENTION

In one embodiment, the present invention is a method and apparatus for dynamic middleware assembly. One embodiment of the inventive method for dynamically assembling middleware at a client involves selecting a middleware component from a group of middleware components, where the selection is based at least in part on a first profile defining characteristics of the client and a second profile defining characteristics of the selected middleware component. The selected middleware component is then dynamically assembled (installed and configured) at the client.

BRIEF DESCRIPTION OF THE DRAWINGS

So that the manner in which the above recited embodiments of the invention are attained and can be understood in detail, a more particular description of the invention, briefly summarized above, may be obtained by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

In one embodiment, the present invention is a method and apparatus for dynamic middleware assembly. The method and apparatus of the present invention allow applications to be developed, deployed and executed simply by declaring which middleware features and functions are needed; however, unlike traditional middleware architectures, an actual presence and/or prior installation of middleware components on a client is not necessary. The required middleware components are automatically assembled and configured when necessary.

Figure 1:
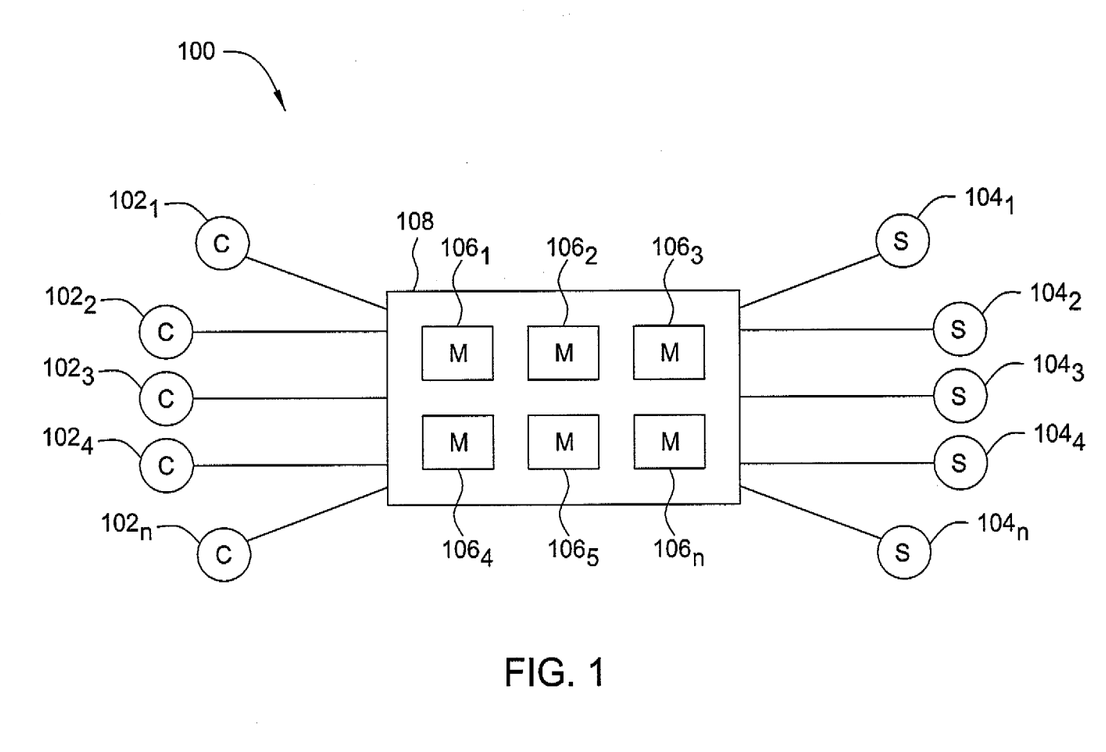
FIG. 1 is a schematic diagram illustrating one embodiment of an exemplary network employing a dynamic middleware system according to the present invention.

FIG. 1 is a schematic diagram illustrating one embodiment of an exemplary network 100 employing a dynamic middleware system according to the present invention. The network 100 comprises one or more clients $102_1$-$102_n$ (hereinafter collectively referred to as "clients 102"), one or more services $104_1$-$104_n$ (hereinafter collectively referred to as "services 104"), and a middleware repository 108 including a plurality of middleware components $106_1$-$106_n$ (hereinafter collectively referred to as "middleware components 106").

Each of the clients 102, services 104 and middleware components 106 is defined by a respective profile. The profiles are declarative specifications (e.g., metadata) that can be compared against other profiles in order to dynamically select and configure particular middleware components 106 that will enable an application at a given client 102 to interact with a specific service 104 or other application, as described in further detail below. In one embodiment, one or more profiles are expressed using known declarative languages that support the definition of requirements and/or assertions of middleware functions and features. For example, in one embodiment, the language defined in the extensible markup language (XML)-based Web Services Policy Framework is used to express the profiles.

In one embodiment, each client 102 is defined by a client profile comprising a declarative specification of the functional and non-functional requirements, capabilities and/or desired quality-of-service of the applications deployed on the client. For example, a client profile may declare secure authentication as a requirement for interaction (e.g., with services or other applications), may specify the preferred use of a reliable messaging protocol with exactly-once delivery semantics, or may require the support of a distributed transaction interoperability protocol for transactional interaction. In one embodiment, the client profile also reflects (directly or indirectly) the middleware components 106 that are already installed at the client 102.

In one embodiment, each service 104 is defined by a service profile comprising a declarative specification of the service's requirements and capabilities (e.g., similar to the client profile). In one embodiment, a service profile is attached to the actual deployed service, for example utilizing known attachment mechanisms such as Web Services Policy Attachment.

In one embodiment, each middleware component 106 in the middleware repository 108 is defined by a component profile comprising a declarative specification of the functional and non-functional properties of the component (e.g., similar to the client or service profile). For example, the component profile of a middleware component that produces security context tokens might describe middleware component's supported functions and security model, or a component profile of a middleware component that implements transactional coordination might describe the middleware component's supported transaction model and transaction protocols. In further embodiments, a component profile of a middleware component may define supported interoperability protocols and/or supported quality of service models.

Figure 2:
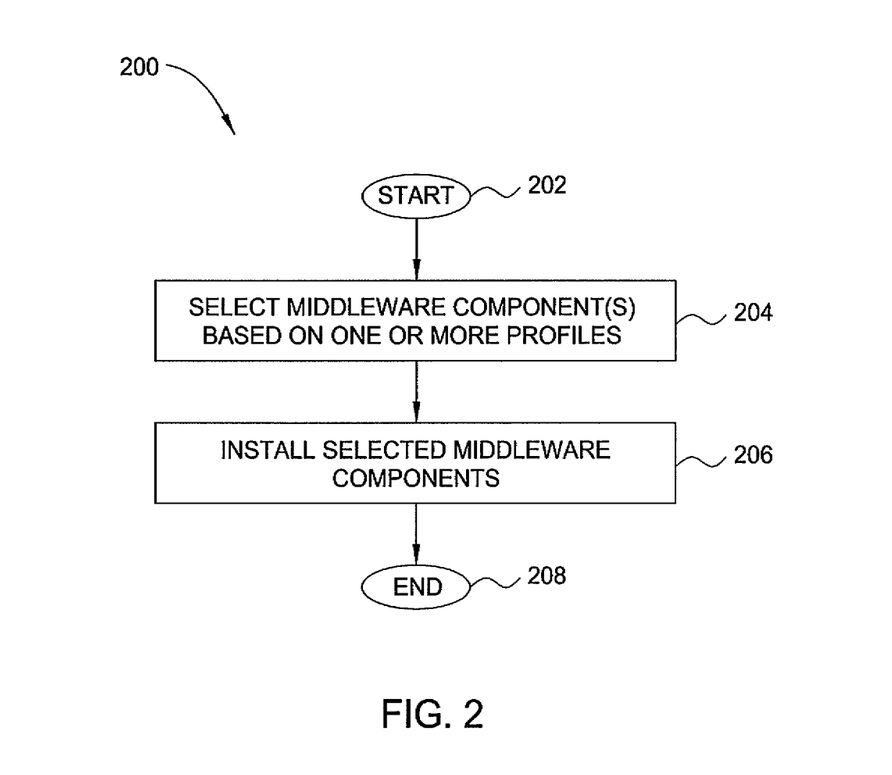
FIG. 2 is a flow diagram illustrating one embodiment of a method for dynamically assembling middleware components according to the present invention.

FIG. 2 is a flow diagram illustrating one embodiment of a method 200 for dynamically assembling middleware components according to the present invention. The method 200 may be executed at, for example, a client (e.g., a client 102 of FIG. 1) or at a discrete middleware assembly module on the network 100.

The method 200 is initialized at step 202 and proceeds to step 204, where the method 200 selects (e.g., from the middleware repository 108) one or more middleware components for deployment at a client. In one embodiment, the middleware components are selected based on one or more profiles pertaining to at least one of the client, a middleware component and a service, as described above with respect to FIG. 1.

The method 200 then proceeds to step 206 and assembles the selected middleware components at the client. Assembling the selected middleware components in accordance with step 206 includes installing and configuring the selected middleware components at the client. In one embodiment, step 206 further includes uninstalling one or more existing or previously installed middleware components. The method 200 then terminates in step 208. The method 200 may be repeated any number of times in order to configure one or more clients or applications for interaction with one or more services.

The method 200, as described above, enables a first application residing at a client to simply specify one or more services or other applications with which the first application wishes to interact, and then dynamically selects and configures the middleware components necessary to support the desired interaction. Thus, the first application, or the client on which the first application resides, need not do anything further than specify the desired interactions.

Moreover, the use of profiles in the selection of middleware components offers an increased level of flexibility for application development, deployment and execution. For example, middleware components may be flexibly distributed between applications and services, or middleware components may be "offloaded" or "hosted" off the network (e.g., network 100) to accommodate changes in computing environments and/or application interaction requirements (e.g., computing load, required reliability or security levels, and the like). For example, an application may require support for the transactional coordination of multiple databases. One solution is to locally install a transaction coordination middleware component at the client. Another solution is to install a smaller middleware component at the client only, and use a remote middleware component that offers transactional coordination as a service. The remote component in the latter case is "hosted" and provided by a third party. Using the methods of the present invention, an application can flexibly switch between these two options over time. This flexibility enables a network that implements a dynamic middleware system of the present invention to better respond to client needs under changing network, application and service conditions.

Figure 3:
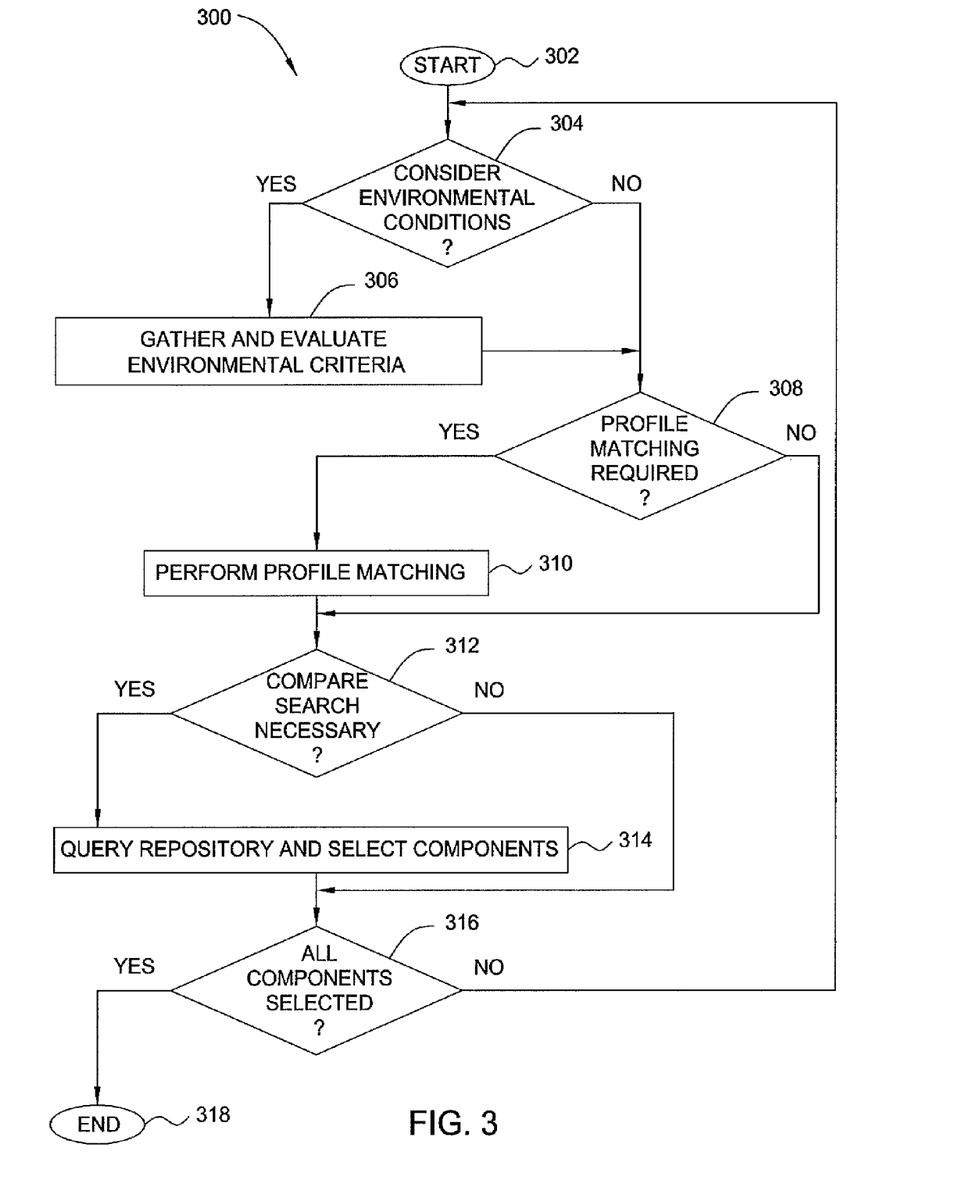
FIG. 3 is a flow diagram illustrating one embodiment of a method for selecting middleware components according to the present invention.

FIG. 3 is a flow diagram illustrating one embodiment of a method 300 for selecting middleware components (e.g., in accordance with step 204 of the method 200) according to the present invention. The method 300 is initialized at step 302 and proceeds to step 304, where the method 300 determines whether one or more environmental conditions should be considered in the selection of middleware components. In one embodiment, environmental conditions are any conditions that affect the selection and assembly of a middleware component at a given client in a network. In one embodiment, relevant environmental conditions include, but are not limited to, network conditions, load conditions, global security policies, business policies, utility policies and service-specific (e.g., specific to the service chosen for interaction) conditions.

In one embodiment, the consideration of environmental conditions is a default step, but may optionally be bypassed. Bypass may be desirable, for example, in a case where a client already knows which middleware components are needed and wants to install these components independent of environmental conditions (requirements for interaction with a particular service may have been communicated in other forms). The client would still require implementation of the present invention for flexible middleware assembly.

If the method 300 determines in step 304 that one or more environmental conditions should be considered, the method 300 proceeds to step 306 and gathers and evaluates relevant environmental data and criteria. The method 300 then proceeds to step 308 and determines whether a profile matching step is required. Alternatively, if the method 300 determines in step 304 that no environmental conditions need to be considered, the method 300 may bypass step 306 and proceed directly to step 308. In one embodiment, the method 300 concludes that profile matching is not required if middleware components are to be installed at the client independent of a particular service interaction (e.g., if an application at the client wishes to install components based on requirements specified by something other than by a particular service); in all or most other cases, profile matching is required.

If the method 300 determines in step 308 that profile matching is required, the method 300 proceeds to step 310 and performs profile matching. In one embodiment, profile matching in accordance with step 310 involves matching a client profile to one or more service profiles. The profile matching step 310 determines whether the client profile and the one or more service profiles are compatible, and if so, which middleware components are required for service interaction.

In one embodiment, known matching techniques are implemented in accordance with step 310. For example, one appropriate matching technique is described by Wohlstadter et al. in "GlueQoS: Middleware to Sweeten Quality-of-Service Policy Interactions", Proceedings IEEE $26^{th}$ International Conference on Software Engineering (ICSE'04), Edinburgh, Scotland, United Kingdom, May 2004. In one embodiment, an acceptable threshold for compatibility between two or more profiles is dependent upon the interaction to be supported. For example, in one embodiment, interactions involving protocols require the profiles to be perfect matches. However, other interactions may tolerate a profile match that is less than perfect or exact.

For example, if a client profile specifies a requirement for a security mechanism, and a service profile of a service desired for interaction specifies a requirement for the same security mechanism, the client profile and the service profile are considered to be compatible in regards to the security aspect by the method 300. Accordingly, a middleware component supporting the specified security mechanism is required for installation at the client. Alternatively, if the service profile specifies a requirement for a security mechanism that is not included in the client profile, the method 300 may still consider the client profile and the service profile to be compatible, and a middleware component supporting the security mechanism specified by the service profile will be required for installation at the client. However, if the client profile explicitly states that it does not support the security (or any other) mechanism required by the service profile, the method 300 will conclude that the client profile and the service profile are not compatible, and the application and the client will be considered incapable of interacting with the desired service.

Once profile matching is completed, the method 300 proceeds to step 312 and determines whether a middleware component search (e.g., using a repository of middleware components) is necessary. However, if the method 300 concludes at step 308 that no profile matching is required, the method 300 may bypass the profile matching step 310 and proceed directly to step 312.

In one embodiment, a middleware component search is necessary if one or more middleware components necessary to support interaction of a matched client and service are not already installed at the client. If the method 300 determines that a middleware component search is necessary, the method 300 proceeds to step 314 and queries the middleware component repository to locate the necessary middleware components (e.g., middleware the will support interaction between a matched client and service). In one embodiment, the repository is searched using data contained one or more of the client profile, environmental data and profile matching results. One or more of the middleware components yielded by the repository search are then selected for installation at the client. In one embodiment, selection of a middleware component is accomplished by verifying the middleware component's compatibility with respect to other middleware components already installed at the client.

In some embodiments, search of the repository may not yield a middleware component having the desired functionality, or may alternatively yield a set of alternative middleware components from which a subset of middleware components can be selected for assembly.

Once the appropriate middleware components have been located and selected, the method 300 proceeds to step 316 and determines whether all middleware components necessary to support interaction of the client and the desired service have been selected. However, if the method 300 determines in step 312 that a component search is not necessary, the method 300 bypasses step 314 and proceeds directly to step 316.

If the method 300 concludes in step 316 that all necessary middleware components have been selected, the method 300 terminates in step 318. Alternatively, if the method 300 determines that one or more additional middleware components still need to be selected, the method 300 returns to step 304 and proceeds as described above. In one embodiment, the method 300 repeats this iterative process until all required middleware components have been selected.

Figure 4:
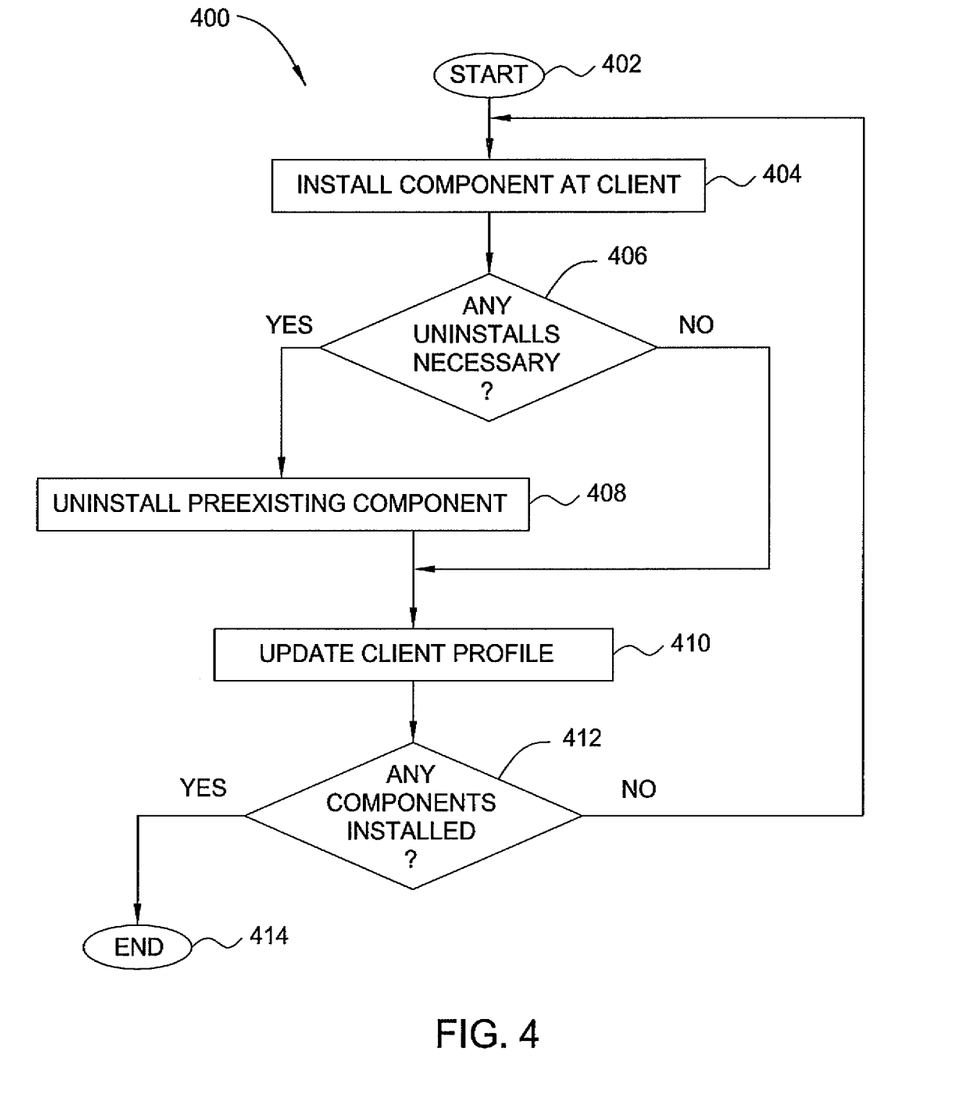
FIG. 4 illustrates one embodiment of a method for installing selected middleware components, according to the present invention.

FIG. 4 illustrates one embodiment of a method 400 for installing selected middleware components (e.g., in accordance with step 206 of the method 200), according to the present invention. The method 400 is initialized in step 402 and proceeds to step 404, where the method 400 installs a selected middleware component at a given client. In one embodiment, installation of the middleware component in accordance with step 404 also involves configuring the selected middleware component for the client. In one embodiment, installation of the middleware component includes downloading code or binaries from the client's network for the selected middleware component (and its other required components), pushing code or binaries from the network to the client, or other known techniques for middleware component installation.

In step 406, the method 400 determines whether it is necessary to uninstall any previously installed or preexisting middleware components at the client (e.g., if the preexisting middleware component is no longer needed and if its presence conflicts with a new middleware component). If the method 400 concludes that one or more preexisting middleware components need to be uninstalled at the client, the method 400 proceeds to step 408 and uninstalls the preexisting component.

The method 400 then proceeds to step 410 and updates the client profile to reflect the newly installed and/or newly uninstalled middleware components and any other changes that impact the client profile. If the method 400 concludes in step 406 that there are no preexisting middleware components that need to be uninstalled at the client, the method 400 bypasses step 408 and proceeds directly to step 410 to update the client profile.

In step 412, the method 400 determines whether all of the selected middleware components have been installed at the client. If the method 400 concludes that all selected middleware components have been installed, the method 400 terminates at step 414. Alternatively, if the method 400 determines that there are one or more selected middleware components that still require installation, the method 400 returns to step 404 and proceeds as described above. In one embodiment, the method 400 repeats this iterative process until all selected middleware components have been installed at the client.

Figure 5:
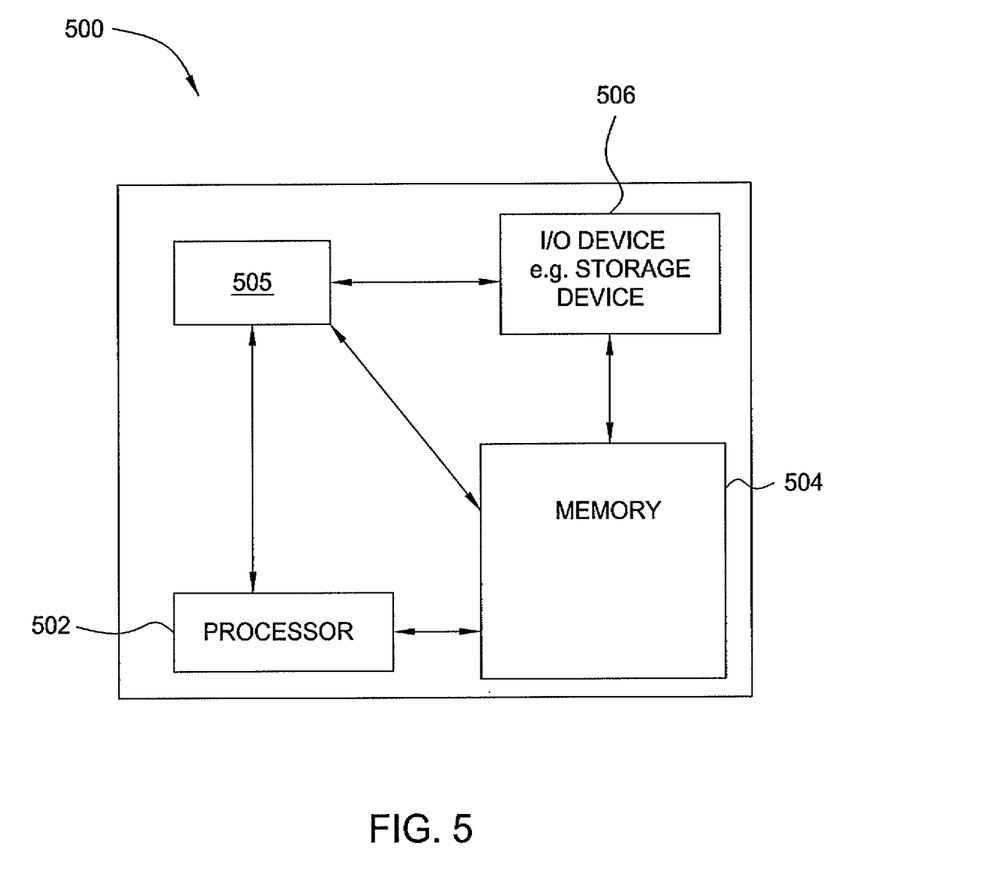
FIG. 5 is a high level block diagram of the present method for dynamic middleware configuration that is implemented using a general purpose computing device.

FIG. 5 is a high level block diagram of the present method for dynamic middleware configuration that is implemented using a general purpose computing device 500. The general purpose computing device 500 represents, for example, a single node (e.g., client 102) of the network 100 illustrated in FIG. 1. In one embodiment, a general purpose computing device 500 comprises a processor 502, a memory 504, a middleware assembly module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the middleware assembly module 505 can be implemented as a physical device or subsystem that is coupled to a processor through a communication channel.

Alternatively, the middleware assembly module 505 can be represented by one or more software applications (or even a combination of software and hardware, e.g., using Application Specific Integrated Circuits (ASIC)), where the software is loaded from a storage medium (e.g., I/O devices 506) and operated by the processor 502 in the memory 504 of the general purpose computing device 500. Thus, in one embodiment, the middleware assembly module 505 for dynamically selecting and configuring middleware components at a client described herein with reference to the preceding Figures can be stored on a computer readable medium or carrier (e.g., RAM, magnetic or optical drive or diskette, and the like).

In other embodiments, the apparatus or methods of the present invention may be provided as a business service. For example, a business might host services, or might host a middleware component repository that can be queried on behalf of one or more user applications in order to locate and/or configure middleware components that support a desired interaction. To this end, the business might receive one or more requests from a user specifying services or applications with which the user wishes to interact. The business may then perform one or more profile matching and query operations as described above in order to properly configure the user's machine or application for the desired interaction.

Thus, the present invention represents a significant advancement in the field of middleware configuration. The system and methods of the present invention allow applications to be dynamically developed, deployed and executed simply by declaring which middleware features and functions are needed. This enables a network that implements a dynamic middleware system of the present invention to better respond to client needs under changing network, application and service conditions.

While foregoing is directed to the preferred embodiment of the present invention, other and further embodiments of the invention may be devised without departing from the basic scope thereof, and the scope thereof is determined by the claims that follow.

The invention claimed is:

1. A method for assembling middleware at a client, wherein the middleware is system software that adds a layer of indirection between an operating system of the client and one or more applications and that enables the one or more applications to interoperate, said method comprising:
    selecting at least one middleware component from a group of one or more middleware components, wherein said selecting is based at least in part on a first profile defining one or more requirements and capabilities of said client and a second profile defining one or more requirements and capabilities of said at least one middleware component; and
    dynamically assembling said at least one middleware component at said client, wherein said dynamically assembling comprises flexibly switching between installing said at least one middleware component locally at said client and installing a smaller middleware component at said client that uses said at least one middleware component remotely as a service provider.

2. The method of claim 1, wherein said flexibly switching is initiated in response to a changing network condition.

3. The method of claim 1, wherein said flexibly switching is initiated in response to a changing application condition.

4. The method of claim 1, wherein said flexibly switching is initiated in response to a changing service condition.

5. The method of claim 1, wherein said first profile defines at least one of: a functional requirement, a non-functional requirement, a capability, and a desired quality of service pertaining to one or more applications residing on said client.

6. The method of claim 1, wherein said second profile defines one or more middleware component characteristics relating to a supported function.

7. The method of claim 6, wherein said one or more middleware component characteristics relate to at least one of: a supported security model, a supported transaction model, a supported transaction protocol, a supported interoperability protocol, and a supported quality of service model.

8. The method of claim 1, wherein said dynamically assembling comprises:
    installing said at least one middleware component at said client; and
    configuring said at least one middleware component for operation at said client.

9. The method of claim 8, wherein said dynamically assembling further comprises:
    uninstalling at least one existing or previously assembled middleware component at said client.

10. The method of claim 1, wherein said first profile and said second profile are expressed using extensible markup language.

11. The method of claim 1, wherein said first profile identifies one or more middleware components already installed at said client.

12. The method of claim 1, wherein said selecting comprises:
    searching a repository containing said group of one or more middleware components by using the first profile and the second profile;
    identifying one or more properties needed by the client to support an interaction between said client and said one or more applications;
    selecting the at least one middleware component, wherein the at least one middleware component is a middleware component for which the one or more properties are expressed by said second profile; and
    confirming that said first profile meets a threshold for compatibility with respect to a third profile associated with said one or more applications, where said at least one middleware component is intended to support an interaction between said client and said one or more applications.

13. The method of claim 1, wherein said selecting accounts for one or more environmental conditions that affect assembly of the at least one middleware component at the client.

14. The method of claim 13, wherein said one or more environmental conditions comprises at least one network condition.

15. The method of claim 13, wherein said one or more environmental conditions comprises at least one load condition.

16. The method of claim 1, wherein said dynamically assembling is performed at runtime.

17. The method of claim 1, wherein said one or more other selected middleware components are hosted by a party other than the client.

18. A non-transitory computer readable storage medium containing an executable program for assembling middleware at a client, wherein the middleware is system software that adds a layer of indirection between an operating system of the client and one or more applications and that enables the one or more applications to interoperate, where the program performs steps of:

selecting at least one middleware component from a group of one or more middleware components, wherein said selecting is based at least in part on a first profile defining one or more requirements and capabilities of said client and a second profile defining one or more requirements and capabilities of said at least one middleware component; and dynamically assembling said at least one middleware component at said client, wherein the dynamically assembling comprises flexibly switching between installing said at least one middleware component locally at said client or installing a smaller middleware component at said client that uses said at least one middleware component remotely as a service provider.

19. Apparatus for assembling middleware at a client, wherein the middleware is system software that adds a layer of indirection between an operating system of the client and one or more applications and that enables the one or more applications to interoperate, the apparatus comprising:

means for selecting at least one middleware component from a group of one or more middleware components, wherein said selecting is based at least in part on a first profile defining one or more requirements and capabilities of said client and a second profile defining one or more requirements and capabilities of said at least one middleware component; and means for dynamically assembling said at least one middleware component at said client, wherein the dynamically assembling comprises flexibly switching between installing said at least one middleware component locally at said client or installing a smaller middleware component at said client that uses said at least one middleware component remotely as a service provider.

* * * * *